May 10, 1955     B. E. WHEELER ET AL     2,707,938
GOVERNOR HYDRAULIC CIRCUIT CONTROLLER
Filed May 10, 1954
2 Sheets-Sheet 2
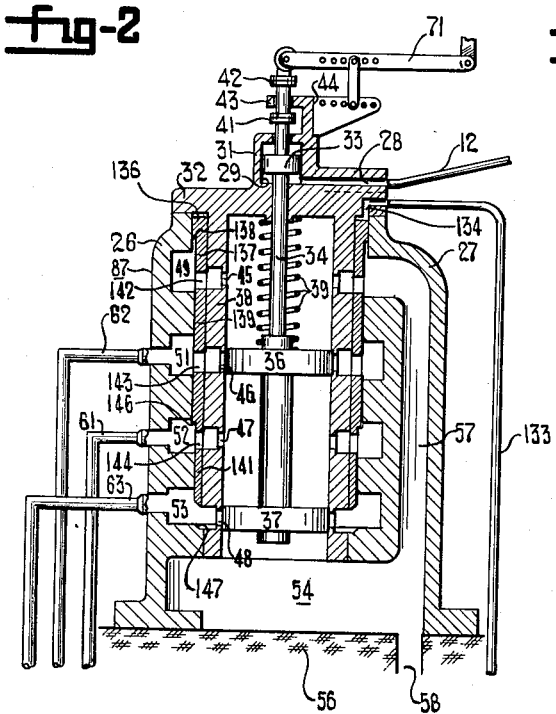
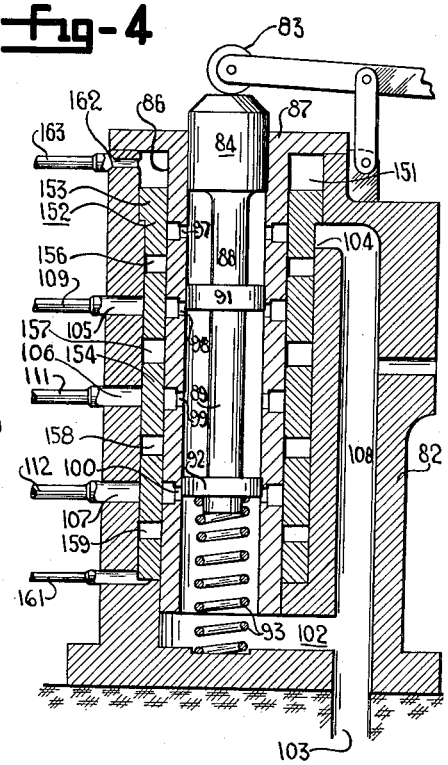
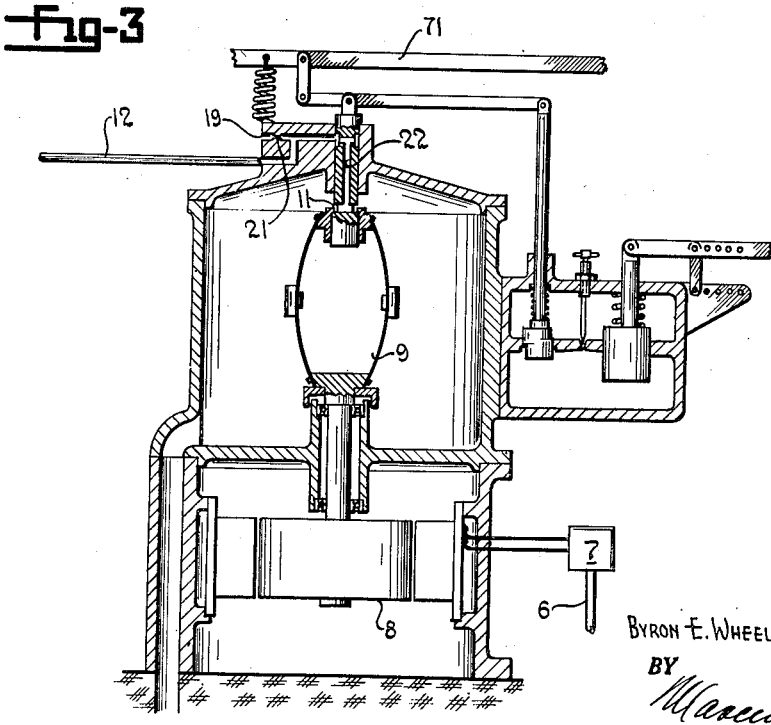
INVENTORS
BYRON E. WHEELER AND ENRICO MICHELETTI
BY
ATTORNEY

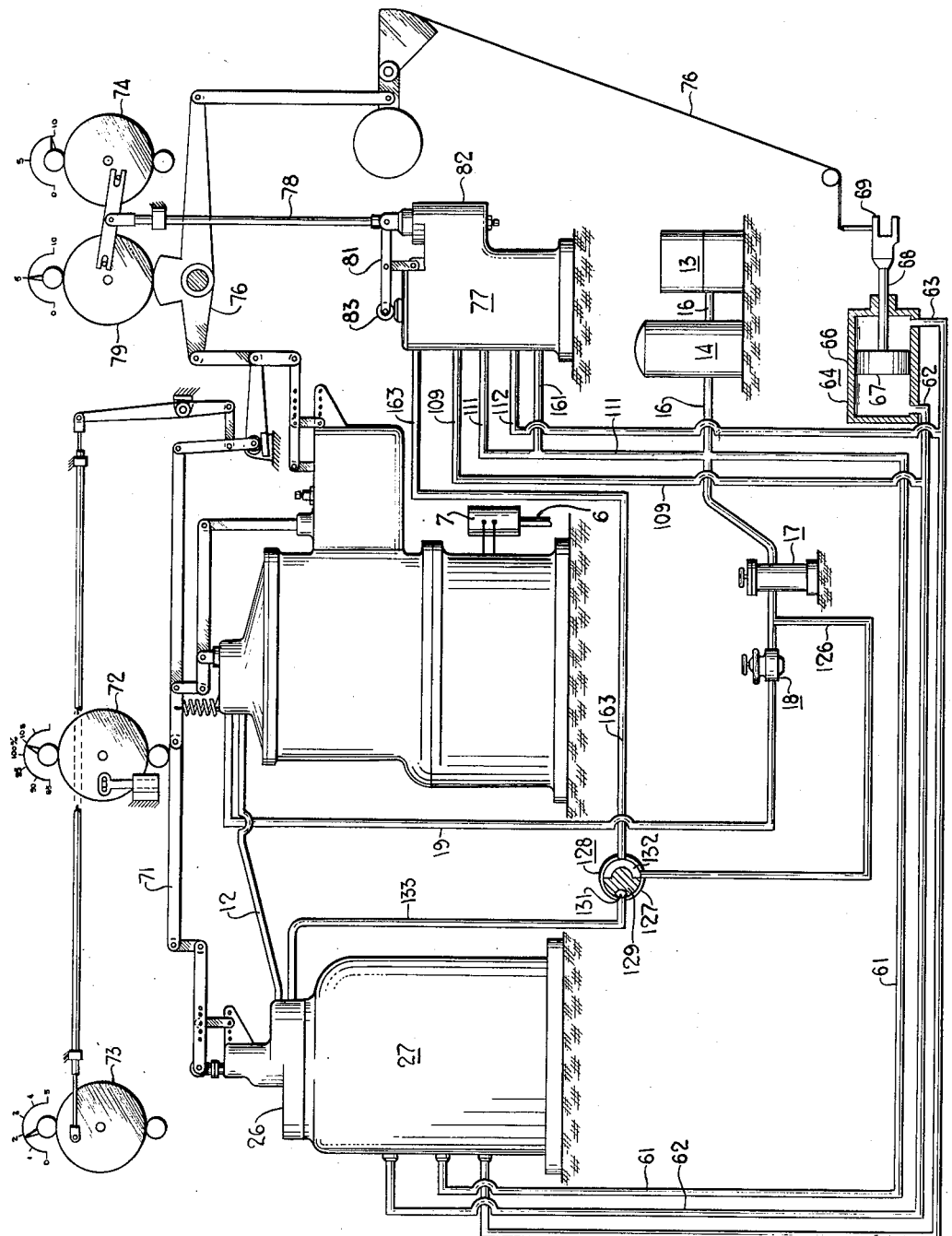

United States Patent Office 2,707,938
Patented May 10, 1955

2,707,938

GOVERNOR HYDRAULIC CIRCUIT CONTROLLER

Byron E. Wheeler and Enrico Micheletti, San Francisco, Calif., assignors to The Pelton Water Wheel Company, a corporation Application May 10, 1954, Serial No. 428,726

7 Claims. (Cl. 121—43)

Our invention relates to apparatus for use in connection with governors employing hydraulic circuits for the control of instrumentalities, such as water wheels or turbines, usually coupled in driving relationship to electric generators, and is especially related to a hydraulic or water wheel governor of the sort shown in the copending application of Fred H. Rued entitled Governor for a Water Wheel, Serial Number 380,075, filed September 14, 1953.

In the operation of water wheels there is customarily employed a main or master servomotor mechanism which actually moves the massive nozzles or gates controlling the speed of rotation of the water wheel. The main servomotor is positioned momentarily by the corresponding position of a regulating or relay valve, or by means of a hand operated auxiliary valve.

It is especially an object of our invention to provide a hydraulic circuit controller effective to switch promptly from a governor controlled valve for regulating the main servomotor to a hand controlled valve for that purpose.

It is another object of the invention to provide a suitable form of regulating or relay valve for incorporation in a hydraulic governor control circuit.

A still further object of the invention is to provide an appropriate auxiliary valve for similar use.

A still further object of the invention is in general to provide an improved governor hydraulic circuit controller.

An additional object of the invention is to provide a governor hydraulic circuit control which can readily be utilized in many different environments for the hydraulic control of instrumentalities by means of alternatively operated controllers.

Other objects, together with the foregoing, are attained in the embodiment of the invention described in the accompanying description and shown in the accompanying drawings in which:

Figure 1 is a schematic diagram showing the governor hydraulic circuit controller of the invention with the necessary associated portions of the governor and of the main servomotor mechanism. This diagrammatic showing is a simplified version of the drawings in the above mentioned co-pending application.

Figure 2 is a cross section on a generally vertical transverse plane through a regulating or relay valve utilized in the circuit controller.

Figure 3 is a cross section showing some of the interior structure of the governor mechanism.

Figure 4 is a cross section on a vertical transverse plane through an auxiliary valve constructed in accordance with the invention.

While the governor hydraulic circuit controller of our invention is readily utilized in many different environments, it has been successfully embodied in connection with a water wheel driving an electric generator, neither of which is shown but which are represented by the shaft 6 (Figs. 1 and 3) driving a small electric generator 7, in turn operating a synchronous motor 8 (Fig. 3) which rotates a flyball governor 9 at a speed commensurate with that of the turbine or water wheel shaft 6. The governor 9 includes a spill valve 11 regulating, in accordance with the position of the flyball weights 9, the hydraulic pressure in a pressure conduit 12. The supply of hydraulic fluid is from a pumping set 13 (Fig. 1), supplying a pressure tank 14 from which flow occurs through a pipe 16, through a filter 17, and through a pressure reducing valve 18 into a conduit 19 extending to the head of the governor. Inside the governor, flow from the conduit 19 is through an orifice 21 (Fig. 3) to the spill valve 11 through a duct 22. From the duct 22, the pressure line 12 leads to the housing 26 (Fig. 1) of a regulating or relay valve, generally designated 27.

The pressure carried to the regulating or relay valve 27 through the conduit 12 is received in a passage 28 (Fig. 2) leading into the lower end of a cylindrical chamber 29 formed in a boss 31 protruding from a cap plate 32 forming part of the casing 26 and secured thereto by suitable fastenings. Operating within the chamber 29 is a reciprocable piston 33 mounted on a central stem 34 extending through the wall of the cap 32 and at its lower end joined to a pair of pistons 36 and 37 reciprocable within a tube 38 depending from the cap 32 into the interior of the casing 26. A coil spring 39 is interposed between the upper piston 36 and the lower surface of the cover 32 and impels the piston 33 downwardly against the counterpressure of the oil from the passage 28. Thus, the piston 33 in its chamber 29 constitutes a pilot servo mechanism for operating the pistons 36 and 37 within the tube 38 in accordance with the pressure within the conduit 12. This pressure in turn is regulated by the governor spill valve 11 (Fig. 3) in precise accordance with the speed of rotation of the shaft 6.

The amount of travel of the pilot servo piston 33 (Fig. 2) is regulated by pairs of stop nuts 41 and 42 on the stem 34 and situated on opposite sides of a datum wing 43 projecting from a bracket 44 upstanding from the boss 31 on the cover 32.

The tube 38 at appropriate intervals along its length is pierced by ports 45, 46, 47 and 48, arranged at convenient peripheral intervals and in approximate alignment with corresponding chambers 49, 51, 52 and 53, within the housing 26. Also within the housing 26 is a lower chamber 54 which is closed by a mounting plate 56. The lower chamber 54 is in communication with the upper chamber 49 through a connecting passageway 57 formed within the casing 26 and communicating through an opening 58 in the plate 56 with a drain (not shown) preferably leading back to the pumping set 13 (Fig. 1).

The chamber 52 (Fig. 2) is connected by a conduit 61 to the conduit 16 (Fig. 1) and therefore serves as a pressure supply conduit operating at the pressure within the pressure tank 14. The chambers 51 (Fig. 2) and 53 are connected by conduits 62 and 63, respectively, to the opposite ends of a main servo-motor mechanism, generally designated 64 (Fig. 1). This structure is a cylinder 66 suitably mounted and containing a piston 67 disposed for reciprocation therein and fastened on a piston rod 68. The rod is provided with a clevis 69 designed to be directly connected to the nozzle needle, the wicket gates, or the main controller of the water for the water wheel mounted on the shaft 6. The arrangement is such that, depending upon the momentary quantity of hydraulic liquid to the right and to the left of the piston 67 within the cylinder 66, the water wheel gates are open, or closed, or in an intermediate operating position.

The amount of flow from the pressure supply chamber 52 (Fig. 2) and through the port 47 into the space between the pistons 36 and 37 and thence either into the chambers 51 or 53, or from the chambers 51 or 53 into the lower chamber 54, or through the port 45 into the upper chamber 49 for return to drain, depends entirely upon the instantaneous position of the stem 34 and this in turn depends upon the pressure in the passage 28 as established by the governor.

The position of the stem 34 also depends upon the position of a linkage, generally designated 71 (Figs. 1 and 2), interconnecting the stem 34 with the governor flyball spill valve 11 and its associated structure and also with certain controlling instrumentalities, such as a speed changer 72 (Fig. 1), a speed droop controller 73, and a gate limit controller 74. Also, there is a mechanical connection, generally designated 76, imparting the motion of the piston rod 68 of the main servomotor to the governor linkage. This linkage is not described in detail herein since it forms no immediate part of this invention and further since it is described in great detail in the above-identified co-pending application.

The position of the stem 34 (Fig. 2) is arranged in accordance with various control instrumentalities, depending primarily upon the operation of the flyball governor 9, so that it is correct to say that the relay or regulating valve 27 is a valve responsive to the governor for controlling the main servomotor mechanism 64.

For various reasons, it is sometimes desired to operate the main servomotor mechanism 64 hydraulically although not under the control of the regulating or relay valve 27, but, rather, under the control of an auxiliary valve 77 (Fig. 1) primarily responsive to manual control rather than to governor control. For that reason, there is provided a mechanical linkage 78 extending primarily from the gate limit controller 74 and also affected by the gate position indicator 79, as described in the co-pending application.

The linkage 78 operates a lever 81 mounted to rock with respect to the housing 82 of the auxiliary valve 77. The end of the lever 81 carries a roller 83 bearing upon the upper end of a stem 84 (Fig. 4) mounted for reciprocation within a tube 86 depending from a cover 87 mounted on the housing 82, being suitably secured thereto by fastenings. The stem 84 is reduced to provide intermediate portions 88 and 89 so as to leave pistons 91 and 92 spaced apart at appropriate intervals. Also, a coil spring 93 bears against the lower piston 92 and against the base of the housing 82 so that the stem 84 is urged upwardly against the roller 83. The tube 86 is interrupted with a plurality of ports 97, 98, 99 and 100 and is open at the bottom to communicate with a chamber 102 opening into a drain 103 extending by a pipe (not shown) to the pumping set 13.

In alignment with the various ports 97, 98, 99 and 100 are chambers 104, 105, 106 and 107, respectively. The chamber 104 communicates by means of a duct 108 with the drain 103. The chamber 105 is joined to a conduit 109 (Figs. 1 and 4) merging with the conduit 62 and therefore is effective, when supplied with pressure fluid, to move the main servomotor 64 toward gate open position. The chamber 106 is joined to a conduit 111 merging with the pressure conduit 16 and therefore supplying pressure to the auxiliary valve 77. The chamber 107 connects to a conduit 112 leading to a junction with the conduit 63 so that when there is hydraulic fluid under pressure in the conduit 112 the gate servomotor 64 is urged toward gate closed position.

Depending upon the position of the piston 84 within the tube 86, there is communication from the chamber 106 and the port 99 into the space between the pistons 91 and 92, into the port 98 and the chamber 105 to the conduit 109, or alternatively through the port 100 into the chamber 107 and into the conduit 112. Simultaneously, when one of the conduits is receiving pressure, the other conduit is connected to drain since flow is then either above or below the pistons 91 and 92 and through the ports 97 or 100 into the drain 103. There is thus provided a mechanism responsive to operation of the gate limit control 74, for example, for moving the auxiliary valve 77 in such a way that the main gate servomotor mechanism is correspondingly actuated.

Since there is a governor responsive valve 27 and a manually responsive valve 77 in the circuit, both effective to control the main servomotor mechanism, we preferably provide means for isolating either one of the valves 27 and 77 and leaving the other valve solely responsible for the control of the main servo mechanism. That control is preferably under the supervision of the operator and is manual, although it can be made automatic if desired.

For that reason, we provide a branch pressure conduit 126 (Fig. 1) leading from the conduit 16 into the housing 127 of a transfer valve, generally designated 128. The housing is preferably circular cylindrical and contains, rotatably mounted within it, a plug 129 having a drain passage 131 therein, as well as a connecting passage 132. Leading from the housing 127 is a conduit 133 (Figs. 1 and 2) extending to the cap 32 of the valve 27 wherein it merges with a passage 134 opening into an annular chamber 136 formed between the tube 38 and the interior of the housing 26. The chamber 136 is of different diameters as it recedes from the cap 32, being smaller below the chamber 52.

Adapted to reciprocate within the chamber 136 is an isolating sleeve 137 (Fig. 2). The sleeve has an enlargement 138 at its upper end fitting snugly within the upper end of the chamber 136, and is of substantially a lesser uniform, diametrical dimension throughout the rest of its length, except that adjacent the lower portion it is reduced in diametrical dimension in a region 141. The sleeve 137 along its length is at appropriate intervals pierced by openings, such as 142, 143 and 144. The opening 142 is designed to register in one position of the sleeve with the port 45 and with the chamber 49 so that there is then free communication therebetween. In this position of the sleeve the aperture 143 establishes communication between the port 46 and the chamber 51; while the aperture 144 establishes communication between the port 47 and the chamber 52. The lower end of the sleeve 137 stops short of the lower end of the casing 26 so that there is established beneath the lower margin of the sleeve free communication between the port 48 and the chamber 53.

Since the chamber 49 is always subject to drain pressure, the difference in annular dimension between the enlargement 138 and the intermediate portion 137 of the sleeve does not impose any translational component on the sleeve. However, the annular face 146, remaining between the intermediate portion 139 and the lower portion 141 of the sleeve, does provide a surface subject to the high pressure within the chamber 52 so that there is an upward component exerted on the sleeve. In the absence of any other force, this upward pressure impels the sleeve into its uppermost position, as shown in Figure 2. When, however, pressure fluid is introduced into the chamber 136 from the conduit 133, then the upward force is overcome and the sleeve 137 is translated downwardly, in the figure, until such time as its lower edge bottoms against a seat 147 in the housing 26. In this lower position of the sleeve, all communication between the various ports 45, 46, 47 and 48 and the respective chambers 49, 51, 52 and 53 is mechanically blocked. It is impossible, therefore, for there to be any flow between the pressure supply conduit 61 and the conduits 62 and 63, so that the main servomotor can not therefore be so actuated.

In the position of the mechanism shown in the drawings there is no pressure liquid in the chamber 136 (Fig. 2) since the conduit 133 is connected to the drain 131 in the transfer valve 128 (Fig. 1). However, when the transfer valve is rotated a half turn from the position shown in Figure 1, then pressure fluid is supplied to the chamber 136 and the sleeve 137 acts to isolate the lines 62 and 63. Thus, by appropriately rotating the transfer valve 128, the regulating or relay valve 27 can be made operative or inoperative, and thus the governor is made either effective upon the main servomotor or is prevented from controlling the main servomotor.

In a somewhat similar fashion, the auxiliary valve 77 is provided with an annular chamber 151 (Fig. 4) extending between the interior of the casing 82 of the valve and the tube 86. The tube 86 makes a tight fit at its lower portion with the casing 82 and at its upper end is spaced from the casing sufficiently to establish the chamber 151. Within the chamber 151 there is provided an isolating sleeve 152 having an enlarged upper end 153 fitting closely within the chamber 151, and having the remaining portion 154 of uniform diametrical dimension to fit for easy reciprocation within the remaining part of the chamber 151. Piercing the sleeve 152 at appropriate intervals are ports 156, 157, 158 and 159.

In the uppermost position of the sleeve 152 (opposite the position shown in the drawing) the aperture 156 establishes communication between the port 97 and the drain port 104. The aperture 157 establishes communication between the port 98 and the chamber 105 leading to the conduit 109. The aperture 158 establishes communication between the port 99 and the chamber 106 connecting with the conduit 111. The aperture 159 establishes communication between the port 100 and the chamber 107 connected to the conduit 112. In the position of the isolating sleeve 152 illustrated in the figure, that is its lower position, all of the mentioned ports are isolated from all of the mentioned chambers and consequently the lines 109 and 112 can not serve to supply liquid to the main servomotor, which is therefore not controlled manually.

Since the diametrical dimension of the major portion of the isolating sleeve 152 is not stepped to provide a pressure area like the pressure area 146 for the sleeve 137, there is provided a duct 161 merging with the pressure conduit 111 and extending into the housing 77 and opening into the annular chamber 151 beneath the lower end of the sleeve 152. Thus, the pressure exerted upon the lower end of the sleeve, tending to lift it, is the maximum pressure available in the conduit 16 and is effective at all times. The chamber 151, however, is somewhat greater in annular area and is connected through a port 162 to a pipe 163 leading into the transfer valve housing 127 substantially opposite the entry of the duct 133. Consequently, when the valve plug 129 is in the position shown, pressure fluid from the conduit 16 traveling through the conduit 126 then flows through the channel 132 into the pipe 163 and is effective within the chamber 151. Due to the greater area at its upper end subject to the same pressure which is imposed upon the lower end, the sleeve is then held in its lowermost position, as shown in Figure 4. When, however, the transfer valve core 129 (Fig. 1) is rotated through substantially a half turn, then the drain port 131 is put into communication with the pipe 163, the pressure liquid leaves the chamber 151 (Fig. 4) and the pressure from the conduit 161 exerted underneath the sleeve 152 lifts it into an active rather than an isolating position. Hence, under the control of the transfer valve 128, either the governor controlled regulating or relay valve 27 can operate the main servomotor mechanism, or the hand operated auxiliary valve 77 can provide the control.

As a special arrangement, the transfer valve plug 129 (Fig. 1) can be rotated only a quarter turn from its position, as shown, with pressure fluid from the conduit 126 then being communicated to both the chamber 136 (Fig. 2) of the regulating or relay valve 27 and the chamber 151 (Fig. 4) of the auxiliary valve 77. In that instance, the isolating sleeve 137 is lowered to isolate the relay valve 27, while the isolating sleeve 152 is lowered or maintained in lower position so as to isolate the auxiliary valve 77 as well. In that fashion, the main servomotor mechanism 64 (Fig. 1) is not actuated at all and is completely shut down.

What is claimed is:

1. A governor hydraulic circuit controller comprising a servo-motor, a supply of hydraulic fluid under pressure, a hand operated valve for controlling flow of said hydraulic fluid between said supply and said servo-motor, a governor operated valve in parallel with said hand operated valve for controlling flow of hydraulic fluid between said supply and said servo-motor, a first hydraulically actuated isolating sleeve movable into and out of a position blocking said hand operated valve, a second hydraulically actuated isolating sleeve movable into and out of a position blocking said governor operated valve, and a control valve for hydraulically moving said isolating valves alternately.

2. A governor hydraulic circuit controller comprising a servo-motor, a supply of hydraulic fluid under pressure, a first valve for controlling flow of said hydraulic fluid between said supply and said servo-motor, a second valve in parallel with said first valve for controlling flow of hydraulic fluid between said supply and said servo-motor, a first hydraulically actuated isolating sleeve movable into and out of a position blocking said first valve, a second hydraulically actuated isolating sleeve movable into and out of a position blocking said second valve, and a control valve for hydraulically moving said first and second valves simultaneously into opposite positions.

3. A governor hydraulic circuit controller comprising a servo-motor, a supply of hydraulic fluid under pressure, a pair of parallel hydraulic circuits between said supply and said servo-motor, each of said circuits including a plurality of conduits, a pair of isolating valves, one in each of said circuits, said isolating valves controlling flow in said plurality of conduits, and means for simultaneously operating said isolating valves to open all of said plurality of conduits in one of said circuits and to close all of said plurality of conduits in the other of said circuits and vice versa.

4. A governor hydraulic circuit controller comprising a servo-motor, a supply of fluid under pressure, a hydraulic circuit including a plurality of conduits between said supply and said servo-motor, an isolating valve in said circuit and having portions of said conduits intersected by an annular chamber, a sleeve movable in said chamber into and out of a position blocking said conduits, and means for subjecting the opposite ends of said sleeve alternatively to fluid under pressure from said supply to move said sleeve into and out of said position.

5. A governor hydraulic circuit controller comprising a servo-motor, a supply of fluid under pressure, a pair of parallel hydraulic circuits between said supply and said servo-motor, each of said circuits including a plurality of conduits, a pair of isolating valves, one in each of said circuits, each of said valves having portions of said conduits intersected by an annular chamber, sleeves movable in said chambers into and out of positions blocking said conduits, and means for simultaneously subjecting one end of one of said sleeves and the other end of the other of said sleeves to fluid under pressure from said supply to move said sleeves oppositely.

6. A governor hydraulic circuit controller comprising a servo-motor, a supply of fluid under pressure, a pair of parallel hydraulic circuits between said supply and said servo-motor, each of said circuits including a plurality of conduits, a pair of isolating valves, one in each of said circuits, each of said valves having portions of said conduits intersected by an annular chamber and by a central chamber, each of said valves having a stem for controlling flow between said conduit portions, each of said valves having a sleeve movable in said annular chamber into and out of a position blocking said conduits, and means for hydraulically moving one of said sleeves into said blocking position and moving the other of said sleeves out of said blocking position.

7. A governor hydraulic circuit controller comprising a servo-motor, a supply of fluid under pressure, a hydraulic circuit between said supply and said servo-motor, said circuit including a plurality of conduits, an isolating valve in said circuit having portions of said conduits intersected therein by an annular chamber and a central chamber, a valve movable in said central chamber to control flow between said conduit portions for correspondingly actuating said servo-motor, a sleeve movable in said annular chamber into and out of a position blocking all of said conduit portions, and means for alternately subjecting opposite ends of said annular chamber to hydraulic pressure from said supply for moving said sleeve into and out of said position.

References Cited in the file of this patent

UNITED STATES PATENTS

| | | |
|---|---|---|
| 1,987,651 | Wiegand | Jan. 15, 1935 |

FOREIGN PATENTS

| | | |
|---|---|---|
| 598,185 | Great Britain | Feb. 12, 1948 |